United States Patent
Huang et al.

(10) Patent No.: US 10,882,326 B2
(45) Date of Patent: Jan. 5, 2021

(54) INKJET RECEPTIVE COMPOSITIONS AND METHODS THEREFOR

(71) Applicant: CRYOVAC, LLC, Charlotte, NC (US)

(72) Inventors: Tom N. Huang, East Amherst, NY (US); Edgardo Lopez, Grand Island, NY (US); Lawrence A. Pilon, Grand Island, NY (US)

(73) Assignee: Cryovac, LLC, Charlotte, NC (US)

( * ) Notice: Subject to any disclaimer, the term of this patent is extended or adjusted under 35 U.S.C. 154(b) by 51 days.

(21) Appl. No.: 15/588,248

(22) Filed: May 5, 2017

(65) Prior Publication Data
US 2017/0321084 A1 Nov. 9, 2017

Related U.S. Application Data

(60) Provisional application No. 62/332,957, filed on May 6, 2016.

(51) Int. Cl.
| | |
|---|---|
| C09D 7/47 | (2018.01) |
| B41M 5/52 | (2006.01) |
| C09D 7/61 | (2018.01) |
| C09D 7/45 | (2018.01) |
| B41F 5/24 | (2006.01) |
| B41J 2/01 | (2006.01) |
| B41J 11/00 | (2006.01) |
| C09D 175/04 | (2006.01) |
| B41J 2/21 | (2006.01) |

(52) U.S. Cl.
CPC .............. B41J 2/2107 (2013.01); B41F 5/24 (2013.01); B41J 2/01 (2013.01); B41J 11/002 (2013.01); B41M 5/5218 (2013.01); B41M 5/5227 (2013.01); B41M 5/5281 (2013.01); C09D 7/45 (2018.01); C09D 7/47 (2018.01); C09D 7/61 (2018.01); C09D 175/04 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/1443; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218

See application file for complete search history.

(56) References Cited

U.S. PATENT DOCUMENTS

| | | | |
|---|---|---|---|
| 4,554,181 A | 11/1985 | Cousin et al. | |
| 4,944,988 A | 12/1990 | Yasuda et al. | |
| 5,879,442 A | 3/1999 | Nishiguchi et al. | |
| 6,114,022 A | 9/2000 | Warner et al. | |
| 6,156,384 A | 12/2000 | Huffer et al. | |
| 6,403,224 B1 * | 6/2002 | Okajima | B41M 5/508 428/423.7 |
| 6,465,081 B2 | 10/2002 | Sarkar et al. | |
| 6,623,817 B1 | 9/2003 | Yang et al. | |
| 6,670,037 B1 | 12/2003 | Okura et al. | |
| 6,743,514 B1 | 6/2004 | Samaranayake | |
| 6,979,481 B2 | 12/2005 | Gaynor et al. | |
| 7,439,295 B2 | 10/2008 | Gibbison et al. | |
| 7,655,296 B2 | 2/2010 | Haas et al. | |
| 7,972,666 B2 | 7/2011 | Johnson et al. | |
| 8,431,193 B2 | 4/2013 | Romano, Jr. et al. | |
| 8,440,273 B2 | 5/2013 | Hood | |
| 8,480,225 B2 | 7/2013 | Romano, Jr. et al. | |
| 8,727,528 B2 | 5/2014 | Romano, Jr. | |
| 8,821,997 B2 | 9/2014 | Romano, Jr. et al. | |
| 9,067,448 B2 | 6/2015 | Dannhauser et al. | |
| 2003/0203133 A1 | 10/2003 | Maekawa | |
| 2003/0203134 A1 | 10/2003 | Sheng | |
| 2004/0059045 A1 | 3/2004 | Kitchin et al. | |
| 2004/0189778 A1 | 9/2004 | Stork et al. | |

(Continued)

FOREIGN PATENT DOCUMENTS

| | | |
|---|---|---|
| EP | 1 016 545 | 7/2000 |
| EP | 1 193 079 | 4/2002 |

(Continued)

OTHER PUBLICATIONS

Response to Office Action, dated Nov. 6, 2014, for U.S. Appl. No. 13/462,067, Applicant Thomas Joseph Dannhauser, et al. (8 pages).
Non-Final Office Action, dated Nov. 6, 2014, for U.S. Appl. No. 13/462,067, Applicant Thomas Joseph Dannhauser, et al. (12 pages).
Response to Office Action, dated May 24, 2012, for U.S. Appl. No. 12/855,135, Applicant Charles E. Romano, Jr. et al. (8 pages).
Non-Final Office Action, dated May 24, 2012, for U.S. Appl. No. 12/855,135, Applicant Charles E. Romano, Jr. et al. (12 pages).
International Search Report and Written Opinion of International Application No. PCT/US2017/031365, dated Oct. 17, 2017, Applicant RR Donnelley & Sons Company (21 pages).
International Preliminary Report on Patentability of International Application No. PCT/US2017/031365, dated Nov. 15, 2018, Applicant R.R. Donnelley & Sons Company (14 pages).

*Primary Examiner* — Manish S Shah
(74) *Attorney, Agent, or Firm* — McCracken & Gillen LLC

(57) ABSTRACT

An inkjet receptive composition for use on glossy paper substrates may include a polymer binder, a multivalent salt, a pigment, a surfactant, a defoamer, and water. The polymer may be a polyurethane dispersion. The multivalent salt may be calcium chloride, and the water may be present in an amount greater than about 40 wt %. The inkjet receptive composition may have a viscosity in the range of about 3 and about 500 cP.

7 Claims, No Drawings

(56) References Cited

U.S. PATENT DOCUMENTS

| | | | |
|---|---|---|---|
| 2005/0170108 A1* | 8/2005 | Darsillo | B41M 5/5218 428/32.34 |
| 2006/0001725 A1* | 1/2006 | Nagata | B41M 5/52 347/105 |
| 2006/0044384 A1* | 3/2006 | Romano, Jr. | B41M 5/5245 347/105 |
| 2007/0104899 A1* | 5/2007 | Pearl | B41J 3/28 428/32.24 |
| 2009/0022910 A1* | 1/2009 | Teramae | B32B 23/06 428/32.2 |
| 2009/0053431 A1* | 2/2009 | Koenig | B41M 5/5245 428/32.3 |
| 2009/0213151 A1* | 8/2009 | Dannhauser | B41M 5/508 347/9 |
| 2010/0239761 A1* | 9/2010 | Haenen | B41M 5/502 428/312.8 |
| 2010/0304057 A1 | 12/2010 | Zeng et al. | |
| 2011/0058006 A1 | 3/2011 | Kobayashi | |
| 2011/0111144 A1* | 5/2011 | Wasai | B41M 5/508 428/32.37 |
| 2011/0279554 A1* | 11/2011 | Dannhauser | B41M 5/52 347/73 |
| 2012/0050432 A1* | 3/2012 | Kawakami | B41M 5/506 347/102 |
| 2014/0030451 A1* | 1/2014 | Romano | B41M 5/52 428/32.21 |
| 2014/0161985 A1* | 6/2014 | Gane | B41M 5/502 427/470 |
| 2014/0292951 A1 | 10/2014 | Ferrar et al. | |
| 2015/0344708 A1* | 12/2015 | Niu | B41M 5/5245 428/32.35 |

FOREIGN PATENT DOCUMENTS

| | | |
|---|---|---|
| WO | WO 2004/054813 | 7/2004 |
| WO | WO 2015/084395 | 6/2015 |

* cited by examiner

INKJET RECEPTIVE COMPOSITIONS AND METHODS THEREFOR

CROSS-REFERENCE TO RELATED APPLICATIONS

The present application claims the benefit of provisional U.S. Patent Application No. 62/332,957, filed May 6, 2016. The above listed application is hereby incorporated by reference herein in its entirety.

FIELD OF THE DISCLOSURE

The present disclosure relates generally to inkjet printing systems, and more particularly inkjet receptive compositions that enable the use of an inkjet printing system on a variety of substrates.

BACKGROUND

Inkjet printing systems typically include one or more print units, and each print unit has one or more printheads. A controller controls the printhead to eject a fluid (such as ink or another composition) onto a medium. Each printhead includes a nozzle plate that includes a plurality of orifices (nozzles) through which ink from inside the printhead may be controllably ejected.

Inkjet printing systems have been used in the printing industry for limited commercial print applications. Current inkjet printing systems do not perform up to the standard of offset printing systems on certain absorption surfaces, such as book publishing papers (including ground wood, uncoated free sheet, and matte coated free sheet), and limited absorption surfaces, such as matte, glossy, or silk substrates. For matte and glossy substrates, the use of aqueous based inks sometimes can create performance issues. Accordingly, there remains a need for further contributions in this area of technology.

SUMMARY

According to one aspect, an inkjet receptive composition for use on glossy paper substrates includes a polymer binder, a multivalent salt, a pigment, a surfactant, a defoamer, and water. The polymer is a polyurethane dispersion. The multivalent salt is calcium chloride, and the water present in an amount greater than about 40 wt %. The inkjet receptive composition has a viscosity in the range of about 3 and about 500 cP.

According to another aspect, an inkjet receptive composition for use on matte substrates includes: a first polymer binder, a second polymer binder, a multivalent salt, a first pigment, a second pigment, a surfactant, a defoamer, and water. The water is present in an amount between about 20 and about 40 wt %. The first polymer binder is a polyurethane dispersion. The first pigment is a colloidal silica, the second pigment comprising calcium carbonate. The viscosity of the inkjet receptive composition is from about 3 to about 500 cP.

According to another aspect, a method of printing includes applying an inkjet receptive composition comprising a polymer binder, a multivalent salt, a pigment, a surfactant, a solvent, and water, wherein the inkjet receptive composition is applied in an amount between about 0.2 and about 1.5 g/m$^2$ per side, and the pigment is one of colloidal silica and calcium carbonate, heating the inkjet receptive composition, and jetting an ink onto the inkjet receptive composition.

Other aspects and advantages will become apparent upon consideration of the following detailed description.

DETAILED DESCRIPTION

The main categories of substrates used in book publishing are matte coated free sheet, offset free sheet, and uncoated ground wood. Matte coated and gloss coated papers tend to have poor absorption of the inkjet inks, resulting in puddling and mottle on the surface which causes uneven images and can lead to poor dry durability or water resistance. In addition, the poor absorption can lead to slower drying times which can cause ink offsetting and mechanical issues in the finishing equipment. Ground wood and offset free sheet papers tend to be very porous which allow the inkjet ink to penetrate into the sheet causing low print density and bleed/show through. Lastly, matte and gloss coated papers may have permanence issues, specifically abrasion (dry rub), water resistance (wet rub) and high-lighter smear tests.

Usually, offset papers can have a hydrophobic coating or no coating which affects absorbency. Such papers are printed with conventional offset based inks which result in optical densities greater than 1.3 ODU (optical density units measured using a reflection densitometer), high permanency, and low show/bleed through. Initial tests indicated that typical drop-on-demand inks had lower OD, reduced rub resistance, and increased show through when printing on these substrates (as received) with typical drop-on-demand inkjet inks. In addition, there is a high degree of print mottle and offsetting at higher printing speed due to poor drying and absorption. To adapt these papers to the book publishing industry, an inkjet receptive coating improves the performance on these substrates to suit the needs of book publishers. Furthermore, the coatings must be applied in an efficient and economical method to the manufacturing processes. To meet this requirement, an application process has been selected which occurs in-line on the inkjet press.

Digital printing on common coated offset paper typically has poor image quality exhibiting puddling and mottling of inks on the surface of the paper. Additionally, these coated papers exhibit poor absorbency, high level of mottle (due to pigment agglomeration before the carrier fluid is removed), poor dry-rub durability, poor wet-rub durability, poor hi-lighter smear, and tend to be easily smeared or otherwise disturbed by mechanical means. The root cause is due to common offset paper not having an ink absorbing layer and image dots therefore tend to join together and cause bleeding and mottling during printing. To prevent ink dot gain mixing, bleeding, and further enhance optical density, a quick coagulation method has been enabled in this process through paper pretreatment. Pigment colorants and latexes are negatively charged and can be dispersed in ink formulations. Due to negative charge repulsion each pigment particle is well dispersed which prevents agglomeration in the ink solution. A quick or rapid coagulation process occurs when pigment ink is deposited on the surface of a pre-coated paper. The inkjet receptive composition's cationic charge controls and eliminates the repulsion present between negatively charged particles. Rapid coagulation of the pigmented ink occurs when interacting with pre-coating and prevents dot gain merging, mottling, and bleeding. Thus the precoating produces sharp images and broadens the range of hues achieved on the paper. Although the pre-coating causes pigment crashing and generates sharp printed images across a range of printing speeds, the print durability is still an issue at high print speed.

Inkjet inks contain humectants in typical formulations to prevent printhead nozzle clogging that slows down the ink drying on paper, especially in common offset paper without an ink absorbing layer. Application of an inkjet receptive composition (in a thin layer that can be described as a treatment) can provide an absorbing layer on paper surface which would improve ink drying rates. Coat weight optimization helps to minimize the effect of excess humectants in ink, decrease dryer temperatures, improve efficiency, and prevents higher printing speed degradation of print imaging fixation leading to rub resistance problems. Use of typical drop-on-demand inks with an in-line pre-coating for offset book publishing papers enables superior performance for high color inkjet applications on standard offset papers.

An embodiment of an inkjet receptive composition of the present application includes a polymer binder, a multivalent salt, a solvent, water, and a pigment. The inkjet receptive composition has a total solids content of between about 5 and about 50% by weight, and a ratio of pigment to polymer between about 2:1 and 3:1 by weight.

Suitable polymers for the inkjet receptive composition of the present application include urethane resin emulsions. An appropriate polymer is Takelac® W-635, manufactured by Mitsui Chemicals, Inc. (Tokyo, Japan). Takelac® W-635 is a polyurethane dispersion that has a relatively small particle size, between about 0.03 and about 0.1539 micron. Another useful solvent by Mitsui Chemicals, Inc. is Takelac® W-6355. Takelac® W-6355 is a polyurethane dispersion that has a relatively small particle size. The main difference between Takelac® W-6355 and Takelac® W-6355 is that Takelac® W-635 contains N-methyl-pyrrolidone (NMP), and Takelac® W-6355 does not contain NMP.

The uniquely functional cosolvent N-methyl-pyrrolidone (NMP) is well suited for use in waterborne polyurethane dispersions (PUDs). The use of cosolvents during polyurethane dispersion production is often necessary to enable a smooth reaction between the hydrophilic diol components [e.g., dimethylolpropionic acid (DMPA)] and the more hydrophobic polyurethane prepolymer. In addition, the cosolvent used during the PUD production phase remains in the system and later becomes a useful coalescing solvent when the PUD is applied as a coating to a substrate. The utility of NMP is diminished by the negative health effects of NMP exposure.

Another appropriate polymer is a polyurethane dispersion such as Witcobond™ W-214, sold by Chemtura Corp. of Philadelphia, Pa. Another appropriate polymer is a polyvinyl alcohol dispersion such as Selvol™ Polyvinyl Alcohol 21-205, sold by Sekisui of Japan. Another appropriate polymer is an ethylene vinyl acetate dispersion such as Vinnapas™ 192, sold by Wacker Chemie AG of Munich, Germany. Another appropriate polymer is an ethylene vinyl acetate emulsion, for example Dur-o-Set Elite Plus, sold by Celanese, Inc. of Irving, Tex. A polymer emulsion such as Dur-o-Set Elite Plus exhibits film spreading when heated. The polymer acts as a binder rather than a particle that maintains a spherical shape once applied and cured to form the inkjet receptive layer/treatment. Polymers may be self-crosslinking through heat and/or hydrolysis. Polymers may also be crosslinked via one or more crosslinkers or catalysts.

The polymer acts as a binder to stabilize the pigment in the inkjet receptive layer on the print medium and provides increased long term durability of a final product. Immediate durability refers to the ability of the ink composition to bond to the inkjet receptive layer as the print medium moves quickly through a high speed printing press without transferring to elements of the press. The polymer may be present in an amount between about 4 and about 20 wt % of the inkjet receptive composition, preferably between about 8 and about 12 wt %.

The inkjet receptive composition may include an aqueous-soluble salt of a multivalent metal. Aqueous-soluble is herein defined as at least 0.5 g of the salt capable of dissolving in 100 ml water at 20° C. More preferably, the multivalent metal is a cation selected from $Mg^{+2}$, $Ca^{+2}$, $Ba^{+2}$, $Zn^{+2}$, and $Al^{+3}$, most preferably $Ca^{+2}$ or $Mg^{+2}$ in combination with suitable counter ions.

Multivalent salts used in the formulation may include calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Preferred salts are $CaCl_2$, $Ca(CH_3CO_2)_2$, $MgCl_2$, $Mg(CH_3CO_2)_2$, $Ca(NO_3)_2$, or $Mg(NO_3)_2$, or combinations thereof.

The pigment may be a modified calcium carbonate such as Omyajet B6606 HS which is a surface reacted natural ground calcium carbonate. The calcium carbonate pigment may be present in an amount between about 1 and about 20 wt % of the inkjet receptive composition, preferably about 5 wt %. Other example of a pigment that is suitable in the inkjet receptive surface treatment is Ludox CL-P, a colloidal silica that has a narrow particle range, from about 0.015 to about 0.029 microns, and is substantially clear. The colloidal silica particles are useful in glossy and matte substrates as the particles are positively charged and adhere to negatively charged paper particles. The colloidal silica pigment may be present in an amount between about 10 and about 40 wt % of the inkjet receptive composition, preferably between about 15 and about 35 wt %.

Other pigments may be used comprising white pigments such as titanium dioxide, opacifiers, binders, and other pigments known in the field of inkjet printing.

The total solids content of the inkjet receptive composition is less than about 45% by weight, preferably in a range from about 20 to about 42% by weight. The inkjet receptive composition may include about 0.5 to about 12 percent by weight of a polymer binder and about 30 to about 65 dry weight percent by weight of a multivalent salt. The ratio of total pigment to total polymer may range from about 1.5:1 to about 7:1, preferably between about 2:1 to about 4:1.

The ink receptive compositions of the present application may include water as a solvent. The composition may also include a water-soluble organic compound as a co-solvent. Suitable water-soluble or miscible organic components include: glycerin; alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, methyl lactate, ethyl lactate, propyl lactate and ethylene carbonate; ethers, such as 2-butoxyethanol, tetrahydrofuran or dioxane; glycols, such as propylene glycol, and diethylene glycol; glycol esters; glycol ethers, such as propylene glycol methyl ether, dipropylene glycol methyl ether; ketones, such as acetone, diacetone, or methyl ethyl ketone; lactams, such as N-isopropyl caprolactam or N-ethyl valerolactam, 2-pyrrolidinone, N-methylpyrrolidinone, or N-(2-hydroxyethyl)-2-pyrrolidone; lactones, such as butyrolactone; organosulfides; sulfones, such as dimethylsulfone; organosulfoxides, such as dimethyl sulfoxide or tetramethylene sulfoxide; and derivatives thereof and mixtures thereof.

Additional contemplated components in the inkjet receptive composition may include a solvent, a preservative such as Proxel® GXL by Arch Biocides (Smyrna, Ga.), a humectant (e.g. propylene glycol), a biocide, a colorant, a polymer, a leveling agent, a salt, an inorganic compound, an organic compound, water, a viscosity adjuster such as Walocel® CRT 30 by Dow Chemical Company (Midland, Mich.), a pH modifier such as diethanolamine or triethanolamine, and/or any combination thereof. Acceptable pH range for inkjet receptive composition is preferably from about 2.0 to about 7.0, more preferably from about 3.0 to about 6.0, and most preferably from about 3.5 to about 5.0.

A typical drop-on-demand ink may contain latex polymer which provides better binding ability with various papers. Cationic polymer Dur-o-Set Elite Plus may be applied as a binding agent in receptive coating. This ethylene polyvinyl acetate emulsion is a soft polymer that can provide flexibility and adhesion within polymer films and paper coatings and promote good abrasion. Polymer binders are combined with the multivalent salt ($CaCl_2$) which acts an ink crashing agent. It is well known that the positively charged materials can act as a crashing agent for pigment based ink. These positively charged materials include inorganic multivalent salts and organic cationic polymers that can be introduced into paper coating formulations. Thus high image quality inkjet prints can be achieved by modifying the paper surface with this cationic coating. Additionally, using calcium carbonate in the coating formula provides increased ink absorbing capacity. Furthermore, because Omyajet B6606 HS (calcium carbonate) has a smaller particle size (from about 1.3 to about 2.0 μm) and higher surface area (56 $m^2/g$), it acts as a filler leading to improved optical density by minimizing porosity loss of ink pigments into the paper.

Other additives are typically included in the inkjet receptive formulation to help modify fluid surface tension and foaming control. Additionally colloidal or fumed silica Ludox CL-P promotes image quality and good adhesion. This component provides capillary action to transport the ink vehicle quickly away from the paper surface and provide brilliant colors and uniform ink absorption.

Finally, although the polymer binder provides coating film adhesion on the paper surface, an excess amount of polymer can generate a thicker film and prevent ink penetration and absorption through the coating. This will slow down ink drying, resulting in smearing and rub resistance issues in the printing process.

The inkjet receptive composition has a viscosity such that the inkjet receptive composition can be applied to a substrate using a variety of coating methods. The viscosity may range from about 3 to about 500 cP, preferably may range from about 4 to about 400 cP, and most preferably may range from about 4 to about 90 cP (measured at 25 degrees Celsius, 5 rpm using a Brookfield viscometer) although the preferred viscosity may depend in part on the requirements of the print system to be used. In another embodiment, the viscosity may range from about 2 to about 50 cP, preferably may range from about 3 to about 20 cP, and most preferably may range from about 4 to about 12 cP (measured at 25 degrees Celsius, 5 rpm using a Brookfield viscometer). Particularly, the inkjet receptive composition can be applied with various coating methods including anilox, flexography, reverse gravure, high speed metering, and rod coating.

Surfactants suitable for use in inkjet receptive compositions include non-ionic surfactants containing ethoxylates. Ethoxylate surfactants include fatty alcohol and fatty acid ethoxylates. Ethoxylated acetylenediol based surfactants such as Air Products' Surfynol® 400 series surfactants: Surfynol® 420, 440, 465, and 485, respectively. The Surfynol® 400 series surfactants by Air Products (Allentown, Pa.) are produced by reacting various amounts of ethylene oxide with 2,4,7,9-tetra-methyl-5-decyne-4,7-diol (Air Products' Surfynol® 104), a nonionic molecule with a hydrophilic section in the middle of two symmetric hydrophobic groups.

The ethoxylated alcohols based surfactants suitable for use include Tomadol® series surfactants by Air Products (Allentown, Pa.). Tomadol® ethoxylated alcohols are produced by a base-catalyzed condensation reaction of ethylene oxide with an alcohols of varying chain lengths ranging from $C_9$ to $C_{15}$.

Suitable surface active agents to provide the above surface tension properties include nonionic compounds comprised of silicone, ethylene oxide (EO), and propylene oxide (PO) such as Silwet Hydrostable 212, available from Momentive Performance Products (Albany, N.Y.), fluorinated nonionics such as Multiwet VE-LQ-(AP), available from Croda Industrial Chemicals (East Yorkshire, England) and the like. These surface active agents can be present in amounts ranging from about 0.1 to 3.0% by weight, more preferably less than 1.0% by weight. A suitable surface tension for inkjet receptive composition is preferably in a range from about 20 to about 40 dynes/cm, more preferably in a range from about 25 to about 35 dynes/cm, and most preferably in a range from about 27 to about 34 dynes/cm.

Defoamers suitable for use in inkjet receptive compositions include non-ionic molecular defoamers such as Surfynol® DF series defoamers by Air Products (Allentown, Pa.). One such suitable defoamer is Surfynol® DF-110L.

In other embodiments, the surfactant or surface modifying agent may include, for example, nonionic surfactants, such as poloxamer, ethoxylated acetylenediol, ethoxylated alcohols, or other ethoxylated surfactants. Any type of surfactant may be useful to include in the ink composition to impart the desired properties including anionic, nonionic, cationic, or other types of surfactants. In addition, leveling agents also can act as surface modifying agents in an amount of up to about 2.5% by weight.

In one embodiment, the inkjet receptive composition may be applied to the substrate and heated in a drying tunnel using infrared light. The substrate is heated to a temperature of about 130 degrees Fahrenheit as the infrared light heats the solvent/carrier of the inkjet receptive composition to a temperature greater than 100 degrees Celsius and drives off water and other solvents to cure the inkjet receptive treatment. In another embodiment the ink composition may be printed onto a substrate and heated by a platen. The platen may be heated to a temperature of about 100 degrees Celsius or to a temperature to remove the water carrier from the inkjet receptive composition and cure the precoating.

Unlike the application of ink layers, in which appropriate thickness is achieved by printing multiple layers prior to curing, the inkjet receptive composition may be disposed in a single, thin layer having a thickness in the range from about 0.07 microns to about 0.5 microns using an flexographic printing system. The inkjet receptive compositions may be applied on a paper substrate in a range from about 0.2 to about 1.5 g/m². Preferably, an inkjet receptive compositions may be applied on a matte substrate in a range from about 1.0 to about 1.5 g/m², and an inkjet receptive coating may be applied on a glossy substrate in a range from about 0.2 to about 1.0 g/m².

The following examples further illustrate the disclosure but, of course, should not be construed as in any way limiting its scope.

Glossy papers are typically printed using offset methods include Opus Gloss, Verso Influence, Orion Gloss, Somerset Gloss, and Sterling Gloss (all 80 wt.). A first example inkjet receptive composition, formula A, comprises:

TABLE 1A

Inkjet receptive coating formulation A for glossy paper.

| | Example A | | |
|---|---|---|---|
| Component | Quantity % wt. | Solid Content % wt. | Total solid |
| Mitsui Takelac W-635 | 9 | 33 | 2.97 |
| Anhydrous CaCl2 | 11 | 97 | 10.67 |
| Ludox CL-P | 30 | 40 | 12.00 |
| Surfynol 465 | 0.8 | 100 | 0.80 |
| Surfynol DF-110L | 0.5 | 100 | 0.50 |
| DI Water | 48.7 | | |
| Total | 100 | | 26.94 |

Glossy inkjet receptive compositions were tested using different polymer binders, multivalent salt content, pigment content, surfactant, and total solids. Formula A includes polyurethane dispersion, Takelac® W-635. Formulas B-N include a polyurethanes (Takelac® W-6355 and Witcobond™ W-214) and polyvinyl alcohol (Selvol™ 21-205). Formulas O-P include polyurethane dispersion, Takelac® W-6355.

TABLE 1B

Inkjet receptive coating formulations B-N for glossy paper

| Component | B | C | D | E | F | G | H | I | J | K | L | M | N |
|---|---|---|---|---|---|---|---|---|---|---|---|---|---|
| W-635 (35% solid) | 1 | 2 | 1 | 3 | 4 | 9 | 8 | 30 | 35 | 57.2 | | | |
| Witcobond W 214 (30% solid) | | | | | | | | | | | | | 2.5 |
| PVA 21-205 (20% solid) | | | | | | | | | | | 2.5 | 2.5 | |
| Anhydrous CaCl2 | 10 | 8 | 8.5 | 11 | 11 | 11 | 8 | 11 | 11 | 11 | 3.5 | 6 | 4.5 |
| DF 110L | 0.5 | 0.5 | 0.5 | 0.5 | 0.5 | 0.5 | 0.5 | 0.5 | 0.5 | 1 | 0.5 | 0.5 | 0.5 |
| Surfynol 465 | 0.8 | 0.8 | 0.8 | 0.8 | 0.8 | 0.8 | 0.8 | 0.8 | 0.8 | 0.8 | 1 | 1 | 1 |
| Ludox CL-P | 50 | 50 | 40 | 30 | 30 | 30 | 20 | 30 | 30 | 30 | 80 | 70 | 80 |
| DI Water | 37.7 | 38.7 | 49.2 | 54.7 | 53.7 | 48.7 | 62.7 | 27.7 | 22.7 | 0 | 12.5 | 20 | 11.5 |
| Total | 100 | 100 | 100 | 100 | 100 | 100 | 100 | 100 | 100 | 100 | 100 | 100 | 100 |

TABLE 1C

Inkjet receptive coating formulation O and P for glossy paper.

| | Component | |
|---|---|---|
| Component | O % wt. | P % wt. |
| Mitsui Takelac W-6355 | 9 | 8 |
| Anhydrous CaC12 | 12 | 10 |

TABLE 1C-continued

Inkjet receptive coating formulation O and P for glossy paper.

| | Component | |
|---|---|---|
| Component | O % wt. | P % wt. |
| Ludox CL-P | 30 | 20 |
| Surfynol 465 | 0.8 | 0.8 |
| Surfynol DF-110L | 0.5 | 0.5 |
| DI Water | 47.7 | 60.7 |
| Total | 100 | |
| Viscosity (cP) | 85 | 5 |

Papers commonly used in book publishing when utilizing inkjet printing, which typically consist of uncoated ground wood and matte coated free sheets were precoated. With the use of inkjet receptive treatments for these substrates and the implementation of typical drop-on-demand inks, the print quality significantly improves and approaches that of traditional offset printing in image quality, color chrome, and print repeatability. In addition, the durability is excellent due to the ink and coating being developed and optimized as a system. Thus, this in-line coating and digital printing concept can be extended to digital book production and has a great potential to change commercial book printing economics.

In examples I-XI. The following raw materials were used as received without any further treatment or purification. Polyethylene vinylacetate polymer (Dur-o-Set Elite Plus, 50% solid) purchased from Celanese, Inc.; colloidal silica pigment (Ludox CL-P) purchased from Grace Davison; calcium carbonate pigment (Omyajet B6606 HS, 38% solid) purchased from Omya, Inc.; anhydrous calcium chloride (97-100% solid) and isopropanol purchased from Riverside Chemical Co.; defoamer DF110L and surfactant (Surfynol 465) purchased from Air Products & Chemicals; defoamer (BYK 094) purchased from BYK, Inc.

Inkjet receptive compositions useful in the present disclosure were prepared having the following formulations:

TABLE 2B

Inkjet receptive coating formulation c-10 for matte paper.

| | Example c-10 | | |
|---|---|---|---|
| Component | Quantity % wt. | Solid Content % wt. | Total solid |
| Mitsui Takelac W-6355 | 12.0 | 35 | 4.20 |
| Anhydrous CaCl2 | 12.0 | 97 | 11.64 |
| Ludox CL-P | 30.0 | 40 | 12.00 |
| Surfynol 465 | 0.8 | 100 | 0.80 |
| Surfynol DF-110L | 0.5 | 100 | 0.50 |
| Omya B6606 | 5.0 | 38 | 1.90 |
| Vinnapas 192 | 5.0 | 52 | 2.60 |
| BYK 094 | 0.2 | 100 | 0.2 |
| Isopropanol | 1.0 | 0 | 0 |
| DI Water | 33.5 | 0 | 0 |
| Total | 100 | | 29.14 |
| Viscosity (cP) | | 400 | |

As an initial target focus a select set of book publishing papers (6 total) from the North America and European regions were tested. Selected North American and European Offset Book Publishing Papers included: Verso, New Era Offset matte, 45 basis weight; Verso, Sterling Ultra Matte, 70 basis weight; UPM Silk Matte, 45 basis weight; Verso Escanaba Text Matte, 45 basis weight; Resolute, Resolute Book, 40 basis weight; and Verso Publishers Matte, 50 basis weight.

An anilox coating unit was used to study the in-line coating process with various coating formulations and paper substrates. The purpose of this work is to ensure the inkjet receptive coatings properly interact with the ink, thus reduce pigment mottle or coalescence and increase overall image quality and durability. The inkjet receptive compositions can be applied using a variety of coating methods such as anilox, flexography, reverse gravure, high speed metering, rod coating, and other coating methods known in the art.

Specifically, the following preliminary image quality and durability properties were measured: optical density (OD), dry rub, hi-lighter smear, mottle, and show through. Recent data shows the coating formulations shown in Table 2 provide excellent print performance on the selected book publishing papers when coated with the in-line coating and inkjet printing processes.

The various coating fluids were prepared in 100 L containers with agitation according to the formulas listed below in Table 2. The coating fluids were coated onto the papers listed above using a pre-coater having between 4 and 6 BCM

TABLE 2A

Book Publishing Paper Inkjet Receptive Coating formulations

| Formula Number | c-1 Dur-o-Set Elite Plus | c-2 CaCl₂ | c-3 Omya. B6606 HS | c-4 S-465 | c-5 DF-110L | c-6 BYK-094 | c-7 IPA | c-8 Ludox CL-P | c-9 DI Water | Total % wt. |
|---|---|---|---|---|---|---|---|---|---|---|
| I | 15 | 18 | 27 | 0.8 | 1 | 0 | 0 | 5 | 33.2 | 100 |
| II | 20 | 18 | 27 | 0.8 | 0.5 | 0.3 | 2 | 5 | 26.4 | 100 |
| III | 12.8 | 18 | 20 | 0.8 | 0.5 | 0.3 | 2 | 5 | 40.6 | 100 |
| IV | 10 | 18 | 20 | 0.8 | 0.5 | 0.3 | 2 | 5 | 43.4 | 100 |
| V | 6.4 | 18 | 20 | 0.8 | 0.5 | 0.3 | 2 | 5 | 47 | 100 |
| VI | 6.4 | 18 | 27 | 0.8 | 0.5 | 0.3 | 2 | 5 | 40 | 100 |
| VII | 3.2 | 18 | 20 | 0.8 | 0.5 | 0.3 | 2 | 5 | 50.2 | 100 |
| VIII | 3.2 | 15 | 20 | 0.8 | 0.5 | 0.3 | 2 | 5 | 53.2 | 100 |
| IX | 3.2 | 15 | 6.1 | 0.8 | 0.5 | 0.3 | 2 | 5 | 67.1 | 100 |

(billions cubic microns per square inch) anilox rollers. After the coating process, the coated paper was dried utilizing and IR Dryer system and then printed using the typical drop-on-demand inkjet inks at different speeds (150 fpm and 350 fpm). The printed samples were evaluated for OD, mottle, show/bleed through, hi-lighter smear, and dry rub. The optical density was measured with an X-Rite densitometer and values are provided in ODU (optical density units). Mottle and show through were measured with a QEA PIAS-II digital microscope. Dry rub resistance was tested with a modified Crock Meter utilizing a rubber tip and fifteen strokes approximately one minute after printing. The hi-lighter resistance was measured 24 hours after printing and consisted of smearing the selected hi-lighter five times across printed black text. The following brand hi-lighters were used in the evaluation: Sharpie, Staples, and Avery Marque.

Initially, pre-coating formula I had been used to coat offset papers (New Era Matte, Ultra Sterling Matte, and UPM Silk Matte) through an off-line coating process. These off-line coated papers were tested on a high speed continuous inkjet printing press utilizing typical drop-on-demand inks. The results showed these pre-coated papers had good print quality and no issues traversing a typical in-line continuous high speed automated book binding process such as a Muller-Martini Binding process. However, the pre-coated New Era Matte paper showed surface scratches due to the mechanical processes in the Muller-Martini book signature folding area. This indicated coating formula I did not provide enough initial durability (dry rub) at higher printing speeds. The off-line coating process was used to apply these additional coating formulations to the New Era paper. After the paper was coated, typical drop-on-demand inks were jetted and tested for dry rub using the modified Crock Meter approximately one minute after. Results are shown in Table 3.

The New Era Matte paper was coated with these coating formulations and then inkjet printed with typical drop-on-demand inks at print speeds of 150 and 350 fpm and dryer conditions of 150 degrees Fahrenheit. The results for dry rub indicate Formula II is worse than I and formula III and IV show some improvement over Formula I. Specifically, coating formula IV had acceptable dry rub results for individual printed colors (C, M, Y) and secondary color combinations (red, green, and purple) at printing conditions of 150 fpm and dryer temperature of 150 degrees Fahrenheit. However when the printing speed is increased to 350 fpm and dryer temperature is maintained at 150 degrees Fahrenheit, the dry rub of purple color (red and green are acceptable) shows poor rub. Decreasing the polymer % to 6.4% (3.2% solid), formula V shows a significant improvement in rub resistance compared to formula IV for the secondary color purple at 350 fpm speed/dryer 150 degrees Fahrenheit conditions. Increasing the calcium carbonate % from 20% (7.6% solid) to 27% (10.26% solid), formula VI shows a decrease in dry rub compared to formula V. Further decreasing the polymer content from 6.4% (3.2% solid) to 3.2% (1.6% solid), as in formula VII, shows a degradation in dry rub and the onset of extraneous picking in the secondary combination color purple when compared to formula V. However, coating the paper with formula VII will show a significant improvement in rub resistant when the dryer temperature is increased to about 170 to about 180 degrees Fahrenheit at printing speeds of 350 fpm. Decreasing calcium chloride % amount from 18% to 15% in formulation, formula VIII and IX show no improvement in dry rub for the purple combination color. In addition, some intercolor bleeding and excessive picking starts to occur for these two formulas at the higher print speed.

TABLE 3

Durability evaluation for New Era Offset matte paper at 350 fpm and dryer 150° F.

| Formula | Dry Rub | | | Picking | | |
| --- | --- | --- | --- | --- | --- | --- |
| | Red | Green | Purple | Red | Green | Purple |
| I | Fair | Poor | Poor | Fair | Fair | Poor |
| II | Fair | Poor | Poor | Fair | Fair | Poor |
| III | Good | Fair | Poor | Fair | Fair | Fair |
| IV | Good | Fair | Poor | Fair | Fair | Fair |
| V | Good | Good | Fair | Good | Good | Fair |
| VI | Fair | Fair | Poor | Fair | Poor | Poor |
| VII | Good | Good | Poor | Fair | Fair | Poor |
| VIII | Good | Fair | Fair | Fair | Poor | Poor |
| IX | Good | Fair | Poor | Fair | Poor | Poor |

Based on the results of off-line coating with the New Era paper, coating formula V was selected to test with the in-line pre-coating and typical drop-on-demand inkjet printing processes on various book publish papers. Results of evaluation are shown in Table 4.

TABLE 4

Image Quality and Durability for Selected Book Papers with pre-coat Formula V at 350 fpm and 150 F. drying

| Company | Paper Name | wt. g/m² | O.D. K | O.D. C | O.D. M | O.D. Y | Mottle | Show through | Hi-liter smear | Dry Rub purple |
| --- | --- | --- | --- | --- | --- | --- | --- | --- | --- | --- |
| Finch | IJ Matte | 0 | 1.37 | 1.10 | 1.07 | 0.92 | Fair | Fair | Excellent | Excellent |
| Appleton | Utopia IJ Matte | 0 | 1.50 | 1.22 | 1.22 | 0.96 | Poor | Good | Excellent | Excellent |
| Verso | New Era Offset matte | 0.5-1.0 | 1.52 | 1.39 | 1.26 | 1.04 | Good | Good | Excellent | Fair |

TABLE 4-continued

Image Quality and Durability for Selected Book Papers with pre-coat Formula Vat 350 fpm and 150 F. drying

| Company | Paper Name | wt. g/m² | O.D. K | O.D. C | O.D. M | O.D. Y | Mottle | Show through | Hi-liter smear | Dry Rub purple |
|---|---|---|---|---|---|---|---|---|---|---|
| Verso | Sterling Ultra Matte | 0.5-1.0 | 1.55 | 1.45 | 1.30 | 1.06 | Excellent | Good | Excellent | Good |
| UPM | Silk Matte | 0.5-1.0 | 1.48 | 1.34 | 1.24 | 0.94 | Excellent | Good | Excellent | Fair |
| Resolute | Escanaba Text Matte | 0.5-1.0 | 1.51 | 1.34 | 1.25 | 1.01 | Good | Good | Excellent | Fair |
| Resolute | Resolute Book | 2.0-5.0 | 1.32 | 1.11 | 1.04 | 0.94 | Poor | Poor | Excellent | Excellent |
| Verso | Publishers Matte | 0.5-1.0 | 1.53 | 1.38 | 1.26 | 0.98 | Excellent | Good | Excellent | Poor |

Black optical density (OD) with typical drop-on-demand inkjet inks on IJ treated papers (Finch and Appleton) are 1.37 and 1.5, respectively. For pre-coated New Era, Sterling Ultra, UPM Silk, Escanaba Text, and Publishers Matte, the black OD is 1.48 to 1.55. For the ground wood Resolute Book paper, the black OD was 1.32. Also, the OD of the primary colors, CMY, on these pre-coated matte papers are comparatively higher than the current Finch and Appleton inkjet treated papers when utilizing the typical drop-on-demand inkjet inks. In addition, image quality, mottle, and show through are significantly improved on the pre-coated matte papers compared to matte papers without pre-coating. Based on the QEA analysis, imaging quality and mottle are improved when compared to the current Finch IJ 45# and Appleton Utopia IJ 45# papers. For highlighter smear testing (five Strokes), no issues were found for both the IJ treated papers and the pre-coated matte papers. On the other hand, the dry rub testing of blue (100% cyan/100% magenta) did show a better performance for the Finch and Appleton papers compared to the pre-coated matte papers. Though, the pre-coated papers did show a significant improvement over the base papers prior to pre-coating.

The dry rub properties show acceptable levels of performance with mono color CMY and combination color RGP at 150 fpm (150 degrees Fahrenheit dryer condition). However, when speed is increased to 350 fpm speed (150 degrees Fahrenheit dryer condition), the results of dry rub testing showed formula II is worse than formula I and formula III and IV show a small improvement over formula I (see Table 3). A semi-quantitative measure of dry rub quality is used through the modified Crock Meter apparatus. After rubbing by the Crock Meter, the residual image on the paper reflects the degree of its durability when exposed to dry rub shearing forces. Formula V shows dry rub improves for the purple color. Comparing formula V to formula VI, dry rub of formula VI gets worse in purple and starts to see picking in combination colors. This result shows the amount of calcium carbonate in formula is related with pre-coating dry rub properties. Although both formulas contained same amount of polymer, increasing calcium carbonate amount from 20% (7.6% solid) to 27% (10.26% solid) degraded dry rub. The excess of calcium carbonate may help ink absorption, however this filler particle is not well bonded on the sheet and causes picking due to relatively higher pigment/binder ratio. It also had a dusting tendency during printing. Further decreasing polymer content to 3.2% weight (1.6% solid) in formula VII, VIII, IX, results show picking issue got worse. On the other hand, at the same printing speed 350 fpm, formula VII shows better dry rub at 170-180 degrees Fahrenheit than 150 degrees Fahrenheit dryer conditions. This indicates the dryer efficiency also play important role in print durability. The better drying efficiency definitely helps to speed up print imaging fixation. In addition there is a small trace of mottle and color bleed around imaging area in formula VIII and IX. Apparently, decreasing calcium chloride amount to 15% is close to the basic edge level of crashing charge. Continuing to decrease calcium chloride will cause coating to lack enough charge for rapid pigment coagulation and leads to more mottling and bleeding in print. Usually, increasing printing speed will make this issue even worse in the mottle and bleed performance. Because of increasing printing speed, ink crashing time and speed is negatively affected when compared with lower printing speeds. Thus, it is generally the case that the same image in low speed printing shows better quality than high printing speed.

Formula V was applied and printed on with in-line pre-coating and ink jet printing processes on various book publish papers. The selected results are display in Table 4. Dry rub of purple in all papers show fair to excellent. Due to similar interaction with coating at various papers, ink drying and rub resistant show different degree. Overall, dry rub of current IJ treated paper Finch and Appleton shows better than pre-coated matte papers on immediate post printing performance. However, evaluations the printing after one half hour delay results in dry rub on pre-coated matte papers performing as good as Finch and Appleton papers. In addition, Resolute Book (a ground wood paper) has shown excellent ink dry rub because of the higher ink absorption rate and porosity of the uncoated ground wood type paper. Usually, surface roughness and porosity of paper (e.g., bond paper or ground wood) promotes coating adhesion and better ink absorption. Furthermore, without inkjet receptive treatments, papers like the Resolute Book (i.e., ground wood papers) exhibit worse ink show. Some mottle comes from uneven quick ink absorption in combination colors. If printing is only mono color on Resolute Book substrate, show through is acceptable. However, it is necessary to add more filler in the coating to reduce show through and mottle if process colors printing is applied to Resolute Book. All papers have no issue in high-liter smear. In fact, all pre-coated papers imaging show good to excellent quality and even better than Finch and Appleton. All the optical density of pre-coated matte papers show equal to or even higher than IJ treated Finch and Appleton. Overall, the imaging quality and print durability of the matte formulations show excellent and close to offset printing quality.

TABLE 5

| Image Quality and Durability for Selected Glossy pre-coat formulas B-N | | | | | | | | | | | | | |
|---|---|---|---|---|---|---|---|---|---|---|---|---|---|
| Component | B | C | D | E | f | G | H | I | J | K | L | M | N |
| Rub resistant | fair | fair | fair | good | good | good | good | good | good | good | fair | fair | good |
| Quality (100 fpm) | good | good | good | good | good | good | good | good | good | good | good | good | good |
| Quality (350 fpm) | good | good | good | good | good | good | good | good | good | good | mottle | fair-good | little mottle |

Good quality was observed with glossy formulations B-K. As multivalent salt content was decreased, print quality suffered as shown in formulations L-N.

TABLE 6

| Gloss of inkjet receptive treatment formulas B-N on selected glossy papers at 75° | | | | | | | | | | | | | |
|---|---|---|---|---|---|---|---|---|---|---|---|---|---|
| Component | B | C | D | E | F | G | H | 1 | J | K | L | M | N |
| Opus Gloss #80 | over 70 | over 60 | over 60 | over 60 | over 60 | over 60 | over 60 | over 60 | over 60 | over 60 | over 60 | over 60 | over 70 |
| Verso Influ #80 | over 70 | over 60 | over 60 | over 60 | over 60 | over 60 | over 60 | over 60 | over 60 | over 60 | over 60 | over 60 | over 70 |
| Orion Gloss #80 | over 70 | over 60 | over 60 | over 60 | over 60 | over 60 | over 60 | over 60 | over 60 | over 60 | over 60 | over 60 | over 70 |
| Somerset Gloss #80 | over 70 | over 60 | over 60 | over 60 | over 60 | over 60 | over 60 | over 60 | over 60 | over 60 | over 60 | over 60 | over 70 |
| Sterling Gloss #80 | over 70 | over 60 | over 60 | over 60 | over 60 | over 60 | over 60 | over 60 | over 60 | over 60 | over 60 | over 60 | over 70 |

Acceptable gloss was observed with formulations B-N on selected glossy papers shown in Table 6. Overall, the imaging quality and print durability of the glossy formulations show excellent and close to offset printing quality.

INDUSTRIAL APPLICABILITY

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:

1. An inkjet receptive composition for use on glossy paper substrates comprising:
   a non-anionic polymer binder, the polymer binder comprising a polyurethane dispersion present in an amount from about 5 to about 15 wt %;
   a multivalent salt, the multivalent salt comprising calcium chloride;
   a pigment, the pigment comprising colloidal silica;
   a surfactant;
   a defoamer; and
   water present in an amount greater than about 40 wt %, wherein the inkjet receptive composition has a viscosity of between about 3 and about 500 cP, and wherein a ratio of pigment wt % to polymer binder wt % is within a range from about 2:1 to about 4:1.

2. The inkjet receptive composition of claim 1, wherein the pigment is present in an amount from about 10 to about 40 wt %.

3. The inkjet receptive composition of claim 1, wherein the surfactant is present in an amount from about 0.5 to about 1.5 wt %.

4. The inkjet receptive composition of claim 1, wherein the water is present in an amount from about 40 to about 65 wt %.

5. The inkjet receptive composition of claim 1, wherein the viscosity is from about 4 to about 12 cP, and wherein the polyurethane dispersion does not contain N-methyl-pyrrolidone.

6. A method of printing using an inkjet receptive composition of claim 1, comprising:
   applying the inkjet receptive composition to a substrate, wherein the inkjet receptive composition is applied in an amount between about 0.2 and about 1.0 g/m$^2$;
   heating the inkjet receptive composition; and
   jetting an ink onto the inkjet receptive composition.

7. The method of claim 6, wherein the heating step comprises passing the substrate through an infrared drying system.

* * * * *